Dec. 15, 1931.   R. LA FRANCE   1,837,164
GLASS BLOWING MACHINE
Filed Nov. 1, 1920   6 Sheets-Sheet 1

INVENTOR
R. La France,
By J. F. Rule,
His attorney.

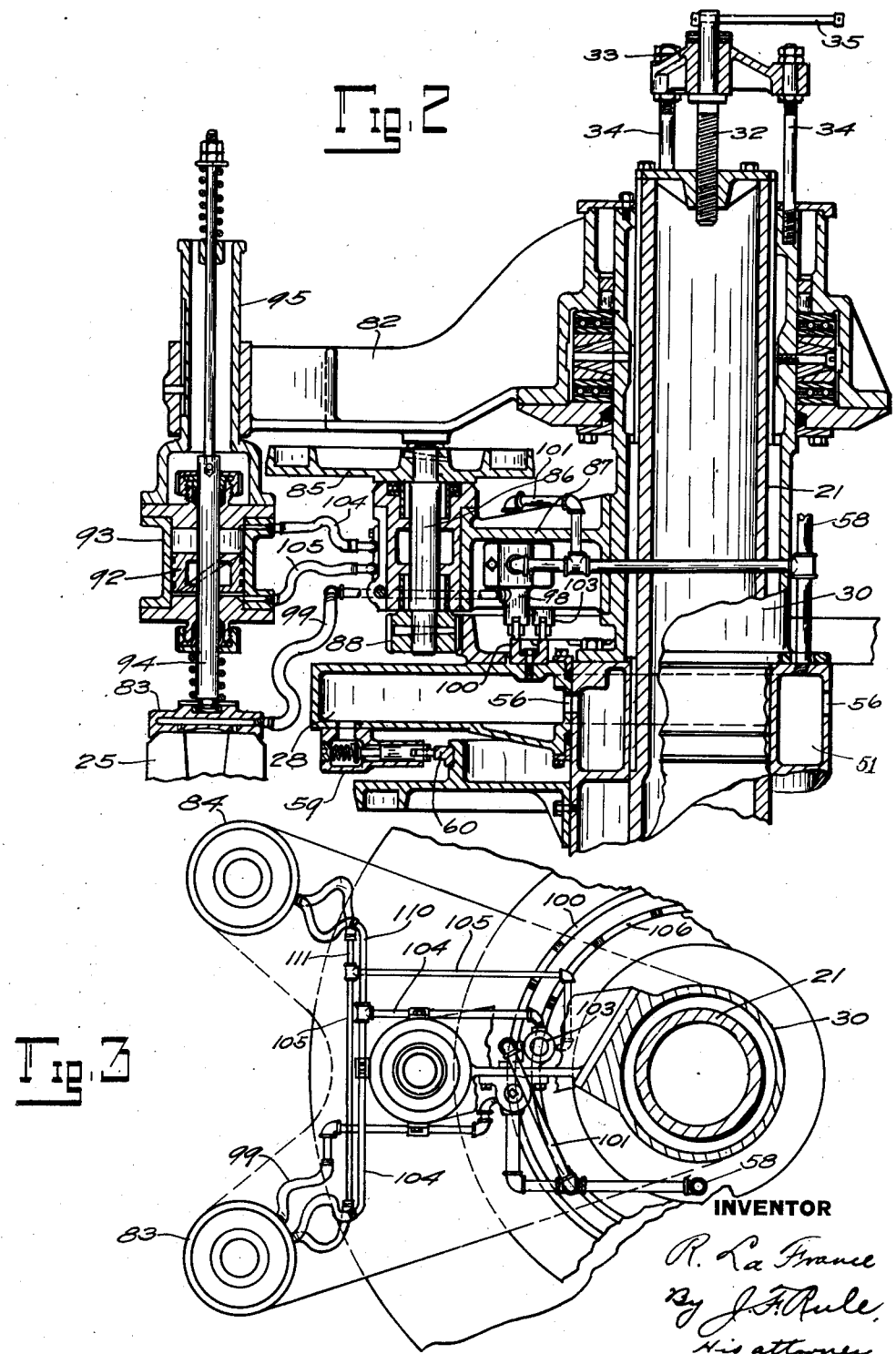

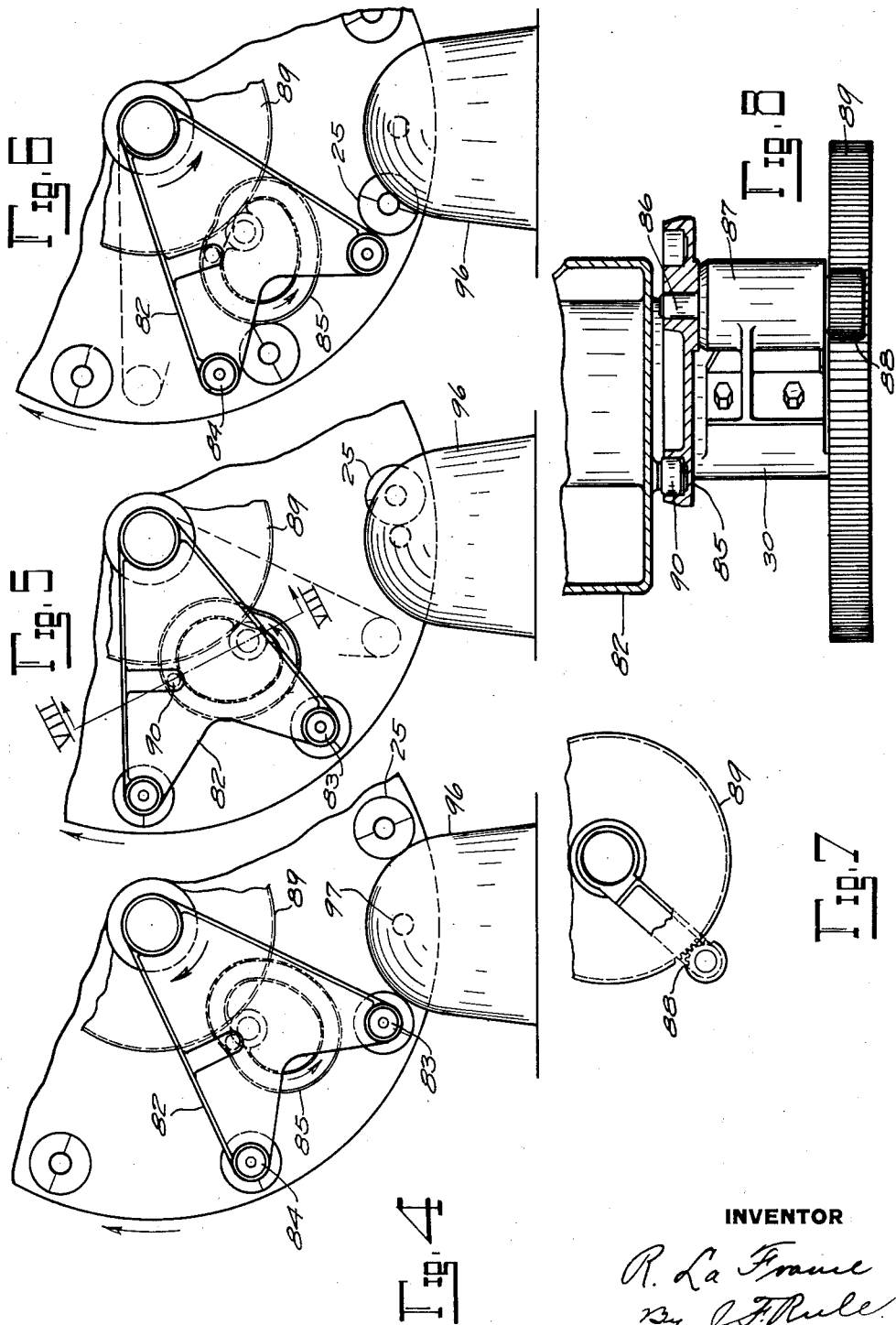

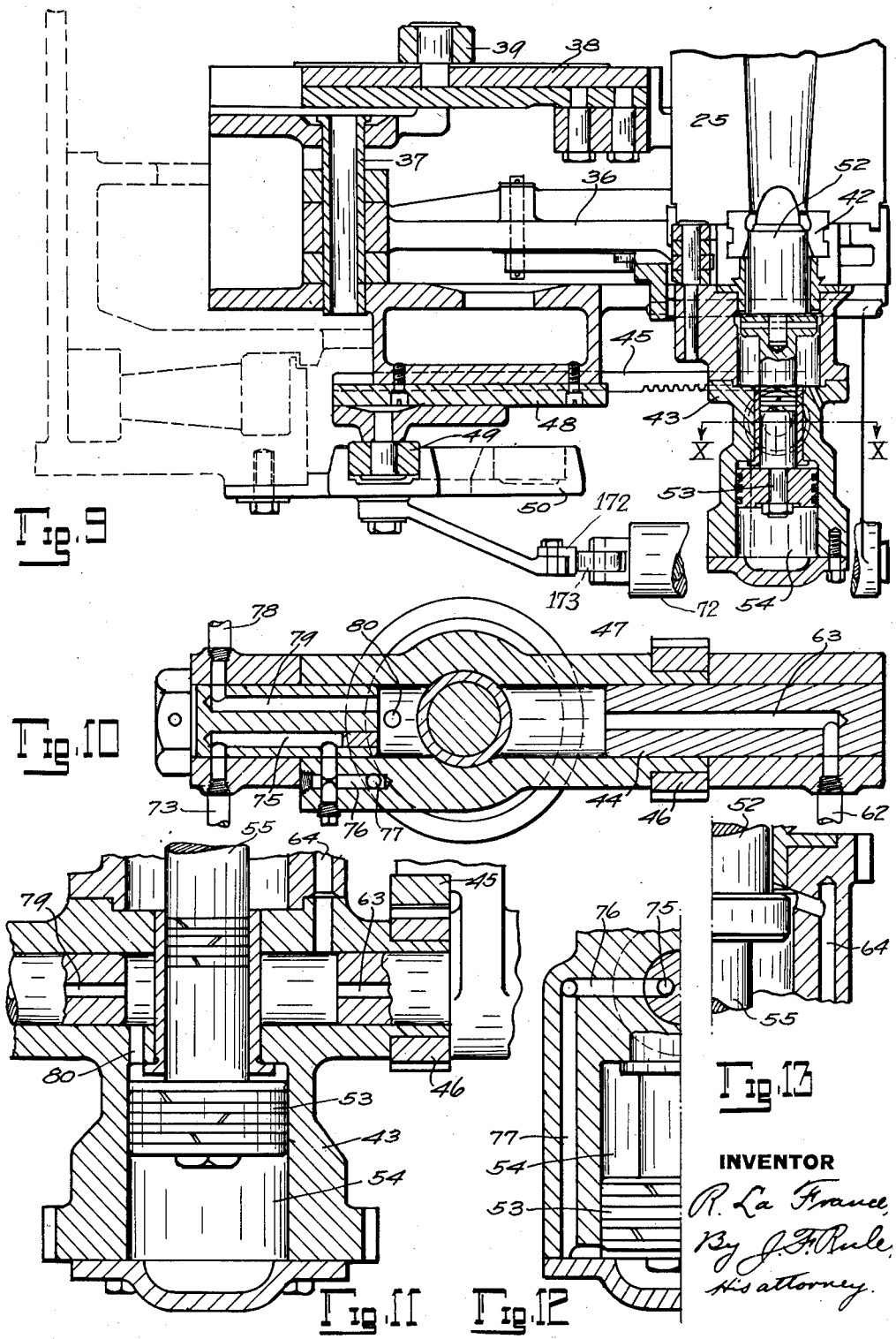

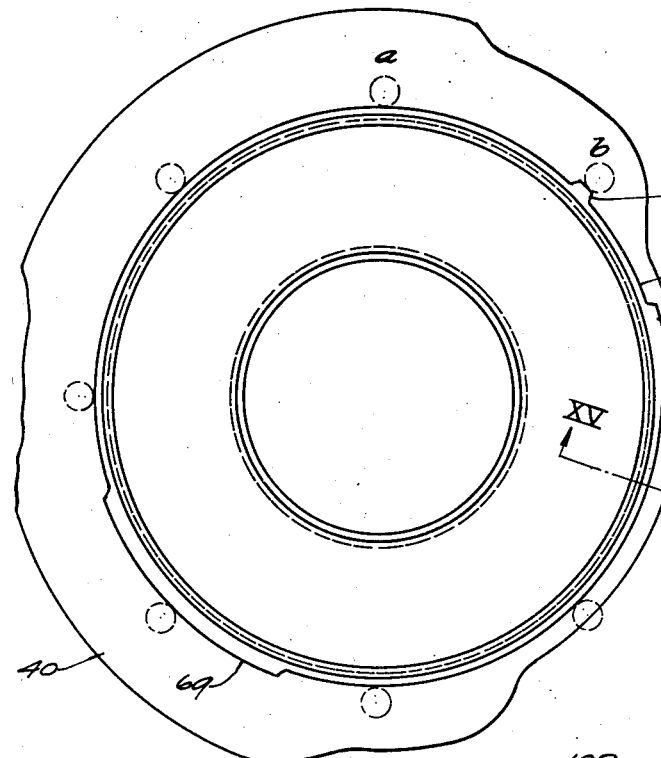
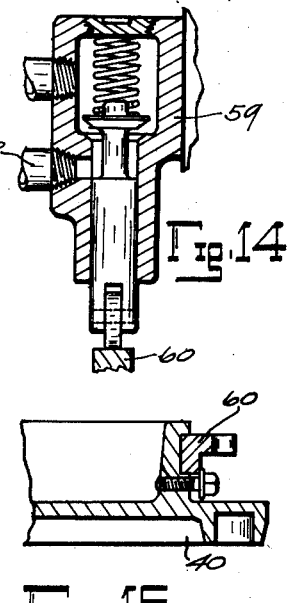
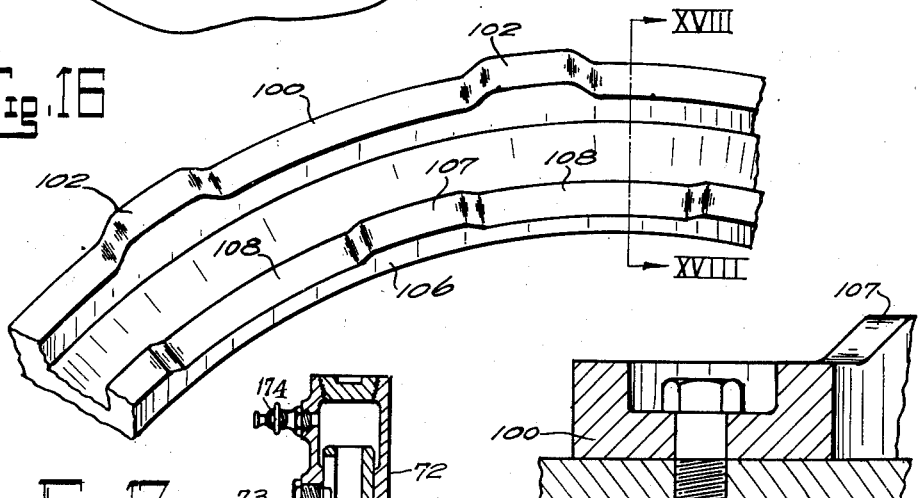
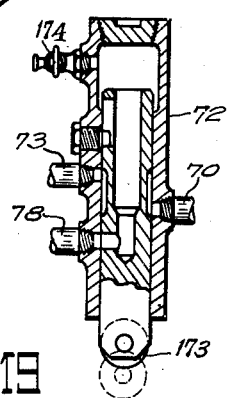

Dec. 15, 1931.  R. LA FRANCE  1,837,164
GLASS BLOWING MACHINE
Filed Nov. 1, 1920   6 Sheets-Sheet 6

INVENTOR
R. La France.
By J. F. Rule.
His attorney

Patented Dec. 15, 1931

1,837,164

UNITED STATES PATENT OFFICE

RICHARD LA FRANCE, OF TOLEDO, OHIO, ASSIGNOR TO OWENS-ILLINOIS GLASS COMPANY, OF TOLEDO, OHIO, A CORPORATION OF OHIO

GLASS BLOWING MACHINE

Application filed November 1, 1920. Serial No. 420,905.

My invention relates to machines for making glass bottles or other blown glassware. The invention as herein disclosed, is embodied in a machine in which the mold carriage rotates continuously. The charges of glass are introduced into the open upper ends of inverted blank molds.

After a charge of glass is introduced, a blowing head is brought down to close the upper end of the mold and air under pressure is admitted through said head to compact the glass in the mold and form the neck of the bottle. At the same time, an initial blow opening is formed in the parison by a plunger operated by an air cylinder. The blowing head is then lifted and a second head moved down onto the mold to form a closure therefor while air is blown through the neck mold to form a hollow parison. Said blowing head and mold closing head are both mounted on a horizontally oscillating frame above the continuously traveling parison molds, being so arranged that while the blowing head is over one mold the closing head is over the next mold. The heads travel with the molds while effecting their functions and then return and travel with the succeeding molds. The heads are moved up and down in the oscillating frame by air operated pistons. After a parison has been blown the blank mold is opened and the neck mold supporting the bare parison projecting upward therefrom, is inverted to swing the parison downward into an open finishing mold which then closes and the parison is blown therein to its finished form. A cooling apparatus arranged to oscillate with said frame, comprises an air tank and nozzles to blow air against the molds for cooling them, and against the end of the parison so that it is hardened sufficiently to retain its shape while being swung down into the finishing mold.

Other features of the invention will appear hereinafter.

The machine herein disclosed embodies various features of construction and operation set forth in the patent to Joseph B. Graham, Number 1,405,204, January 31, 1922, and may be considered an improvement thereon.

In the accompanying drawings:

Figure 2 is a fragmentary part sectional view of the upper portion of the machine.

Figure 3 is a part sectional plan view of mechanism shown in Figure 2.

Figures 4, 5 and 6 are diagrammatic plan views showing the oscillating frame carrying the blow head and mold closing head. Figure 4 shows the frame at the limit of its return movement. Figure 5 shows it at the limit of its advance movement. Figure 6 shows it at an intermediate position during its return movement.

Figure 7 is a detail view of gearing for driving the oscillating frame.

Figure 8 is a sectional elevation at the plane of the line VIII—VIII on Figure 5.

Figure 9 is a sectional elevation through the blank inverting head, and mechanism for actuating said head and the blank mold.

Figure 10 is a sectional plan at the line X—X on Figure 9.

Figure 11 is a sectional detail showing the piston motor for operating the plunger in the neck mold.

Figure 12 is a fragmentary sectional elevation of the same looking in a direction at right angles to that of Figure 11.

Figure 13 is a fragmentary view of the plunger above the piston shown in Figure 11.

Figure 14 is a sectional view of a valve controlling the supply of air for blowing a blank to hollow form.

Figure 15 is a section at the line XV—XV on Figure 16.

Figure 16 is a view showing the cam controlling the supply of air for blowing the glass to hollow form.

Figure 17 is a perspective view of the cams controlling the air supply for lifting and lowering of the blow head and mold closing head and the supply of air through the blow head.

Figure 18 is a section at the line XVIII—XVIII on Figure 17.

Figure 19 shows a valve controlling the air supply to the air motor for operating the plunger.

Figure 20:
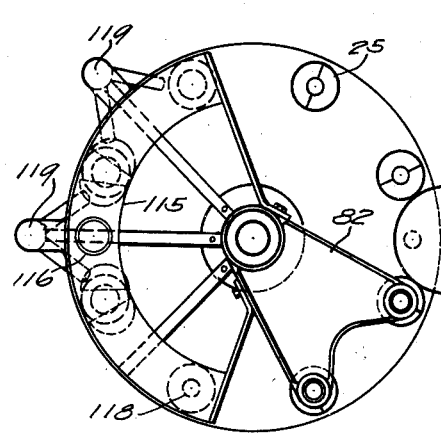

Figure 20 is a diagrammatic plan view of the machine showing particularly the blowing apparatus for cooling the molds and other parts.

Figure 21:
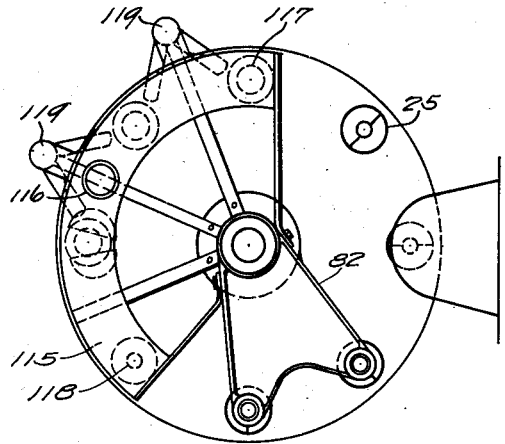

Figure 21 is a similar view but with the parts in a different position.

Figure 22:
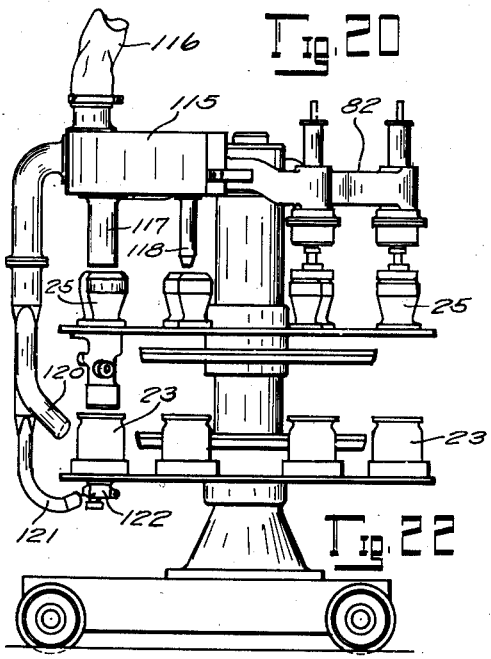

Figure 22 is an elevation of the mechanism shown in Figure 20.

Figure 23:
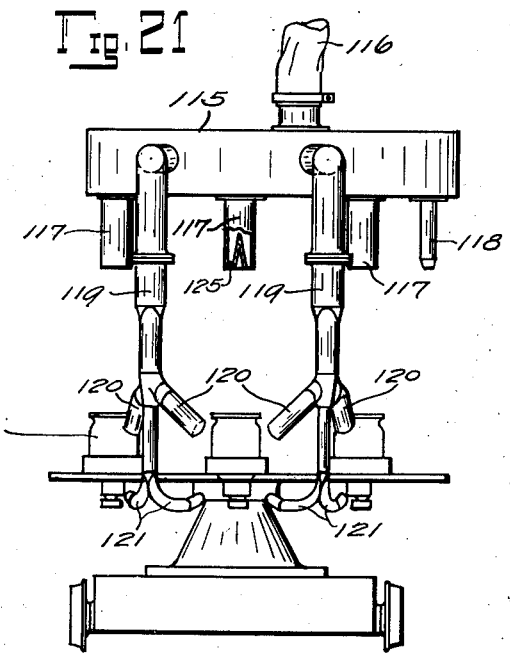

Figure 23 is an elevation of the blowing apparatus viewed in a direction about at right angles to that of Figure 22.

Figure 24:
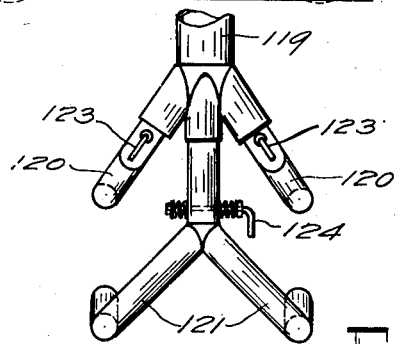

Figure 24 is a detail showing a portion of the blowing apparatus.

The machine is mounted on a base 20 from which rises a stationary central column 21. The mold carriage which rotates continuously about said column comprises a lower mold table or spider 22 on which the finishing molds 23 are supported, and an upper mold table or spider 24 on which the blank moids 25 are supported. The upper spider is carried on vertical columns 26 rising from the spider 22, being clamped to said columns by bolts 27. A drum 28 containing air under pressure, is supported on posts 29 rising from the upper spider 24. Secured to and extending upward from the air drum 28 is a cylinder or hollow column 30 (Fig. 2) surrounding the column 21. Means are provided for adjusting the upper mold carriage with the molds and other parts supported thereon, up and down to permit molds of different lengths to be used. Such adjusting means comprises a screw 32 (Fig. 2) threaded into the head of the column 21, said screw being journalled in a yoke 33 connected by posts 34 to the cylinder 30. To effect such vertical adjustment, the clamping bolts 27 are loosened and the screw 32 rotated by a hand lever 35 to lift or lower the cylinder 30 and connected parts.

Figure 1:
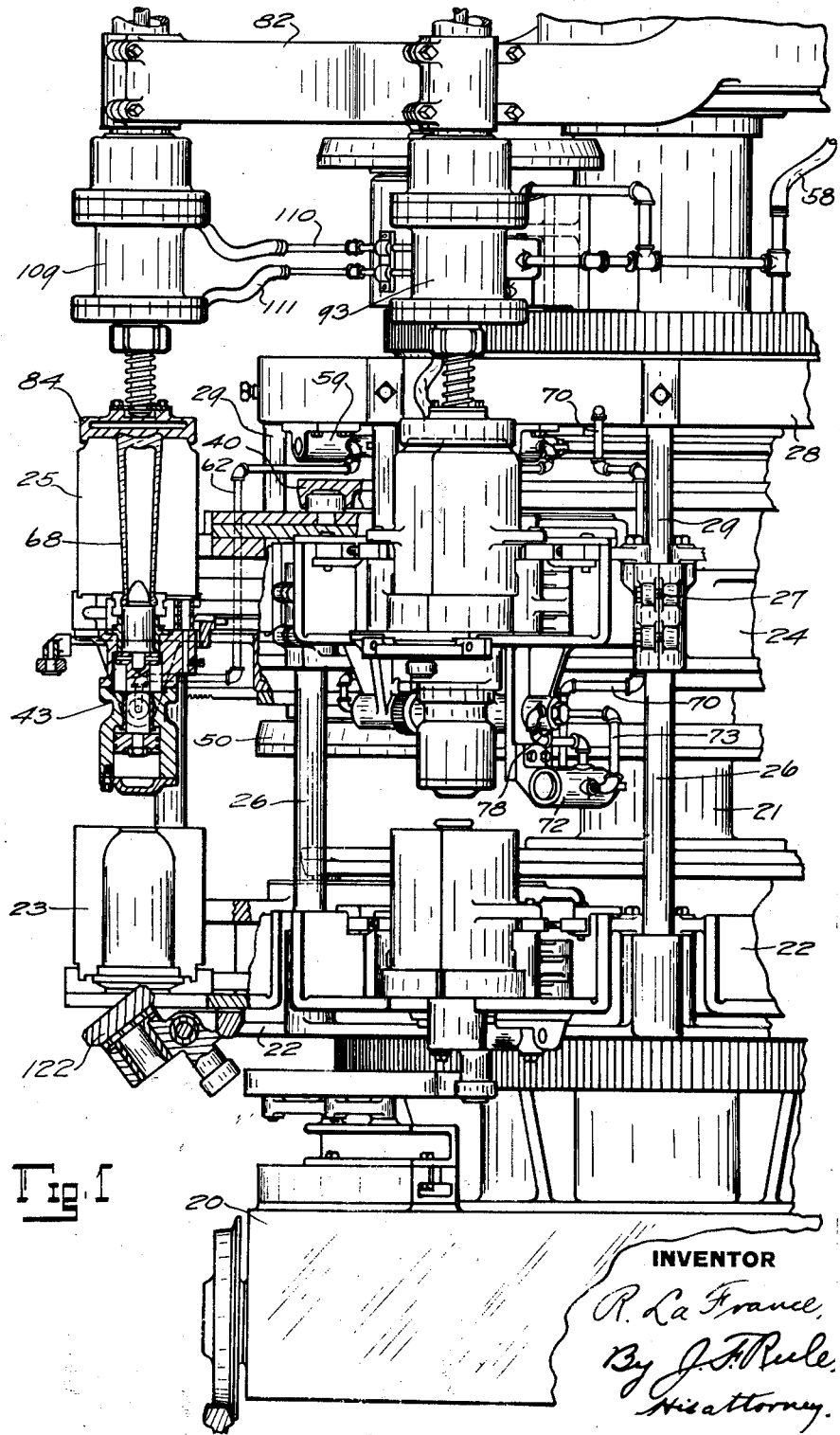
Figure 1 is an elevation partly in section and parts being broken away, of a machine embodying the principles of my invention.

The blank or parison molds 25 are made in sections having arms 36 (Fig. 9) mounted to swing about pivot pins 37 for opening and closing the molds. The mold sections are actuated by a slide 38 on which is mounted a cam roll 39 running in a stationary cam 40 (Fig. 1). The blank mold sections register with the sections of a neck mold 42 mounted on an inverting head 43, the latter having an integral bearing sleeve or hub 47 on a non-rotating horizontal shaft 4. The head 43 is rotated by means of a reciprocating rack 45 which meshes with a pinion 46 on the shaft 47. The rack is connected to a slide 48 carrying a cam roll 49 running in a cam groove on a stationary cam 50. A plunger 52 for forming an initial blow opening in the neck of the bottle, is reciprocated by an air operated piston 53 working in a cylinder 54 in the head 43. The piston is connected through a piston rod 55 to the plunger 52.

Air under pressure is supplied from any suitable source through a supply pipe 58 (Figs. 1 and 2) opening into an annular chamber 51 which communicates with the rotating distributor head or drum 28 through ports 56, so that air under pressure is maintained in said drum. Air for blowing the parison is supplied from the distributor head through valves 59 beneath the head, there being one of said valves for each inverting head 43. The valves 59 are actuated by a cam 60 (Figs. 2 and 16). When the valve is open, air is supplied through a pipe 62 (Fig. 1) and air passages 63, 64 to the neck mold. Referring to Figure 16, the blank mold travels from charging station $a$ to position $b$ at which the cam 60 has a raised portion 66 for momentarily opening the valve 59, so that an initial puff of air is admitted to the blow opening which has been formed in the neck of the blank by the plunger 52. As the mold continues to rotate, the valve 59 is next operated by a raised portion 67 of greater extent so that air is admitted to the blank a sufficient length of time to blow it into a hollow parison 68 (Fig. 1). After this the blank mold is opened by the cam 40, leaving the hollow blank supported in and projecting upward from the neck mold. The cam 50 (Fig. 9) now operates through the rack 45 to invert the head 43, thereby swinging the parison outward and downward into the open blow mold 23, which is then closed automatically around the hollow parison. After this the valve 59 is again opened by the raised portion 69 of the cam 60 and the parison is blown to its finished shape.

Air for operating the plunger pistons 53 is supplied from the drum 28 through pipes 70 (Fig. 1) leading therefrom to valves 72 (Figs. 1 and 19), there being a separate valve 72 for each plunger. The air for lifting the plunger piston 53 flows from the valve 72 through a pipe 73 to the inverting head (Fig. 10) and through channels 75, 76 and 77 to the lower end of the cylinder 54 and thereby raises the plunger 52. Air for lowering the piston 53 is supplied through valve 72, pipe 78, channels 79 and 80, and thereby enters the cylinder 54 above the piston and lowers the plunger. The valve 72 is actuated by a stationary cam 172 (Fig. 9) in the path of a roll 173 carried by the valve. A pet-cock 174 (Fig. 19) in the valve casing may be opened to provide a restricted passageway through which the exhaust air can escape from the pipes 73 and 78. This air may provide sufficient pressure behind the valve to project it after it has passed the cam 172, ready for the next cam operation, or a spring (not shown) may be provided to operate in the usual way to hold the valve in operative relation to its cam.

Referring to Figures 2 to 8 inclusive, a frame 82 carrying a blowing head 83 and a mold closing head 84, is mounted for oscillating movement on the column 30. The heads 83 and 84 are so arranged that they may be moved simultaneously into engagement with two adjacent blank molds and travel therewith as the frame 82 advances with the mold carriage, said heads being then lifted while the frame returns to position for said heads to engage the next succeeding molds. The frame 82 is oscillated by means of a cam 85 having a stem 86 journalled to rotate in a stationary bracket arm 87 projecting from the column 30. A pinion 88 on the stem 86 runs in mesh with a gear 89 mounted on the rotating air drum 28. The gears are so proportioned that the cam 85 makes one complete rotation about its axis while the mold carriage is advancing the angular distance between two adjacent molds. A lug or roll 90 on the frame 82 runs in the cam groove of the cam 85. The cam is so formed that the frame 82 will advance at the same speed as the mold carriage, the heads 83 and 84 being directly over and in register with the molds while the frame advances from the dotted line to the full line position, Figure 5. During this forward movement the blowing head 83 is in its downward position in contact with the blank mold, as shown in Figure 2, and is then lifted to permit its return movement preparatory to engaging the next succeeding mold. The blowing head is lifted and lowered by an air motor comprising a piston 92 working in a cylinder 93, the piston being keyed to a stem 94 attached to the head 83. The cylinder 93 is carried on a stem 95 mounted for vertical adjustment in the frame 82.

The charges of molten glass may be supplied from a boot or extension 96 (Fig. 4) on a melting furnace through a discharge opening 97 as the molds pass beneath said opening. When the mold with its charge of glass reaches a position beneath the blowing head 83, said head is lowered onto the mold by admitting air above the piston 92. Air is then supplied through the blow head to compact the glass in the mold and form the neck of the bottle. This air is supplied from the pressure pipe 58 through a valve 98 and pipe connection 99 extending to said head. The valve 98 is actuated by a cam 100 mounted on the rotating air drum 28. This cam, as shown in Figure 17, comprises raised sections 102 for opening the valve 98 as the blow head engages each succeeding mold. Air for lifting and lowering the blowing head is supplied to the cylinder 93 from the pressure pipe 58 through a pipe 101 and valve 103. Pipe lines 104 and 105 extend from said valve to the upper and lower ends respectively of the cylinder 93. The valve 103 is actuated by a cam 106 which may be formed integral with the cam 100. The cam 106 comprises raised portions 107 by which the valve stem is lifted to admit air to the pipe line 105 to supply air beneath the piston 92 and lift the blow head 83. The low portions 108 of the cam permit the valve to supply air pressure above the piston 92 and lower the blowing head. The mold closing head 84 is actuated by a piston motor 109, the same in construction as the one just described for operating the blowing head. Air is supplied to the motor 109 through branch pipes 110 and 111 leading from the pipes 104 and 105 respectively, so that the two heads are lifted and lowered simultaneously.

Referring particularly to Figures 20 to 24, a blowing apparatus is provided comprising an air tank 115 attached to the frame 82 to oscillate therewith. A constant supply of air under pressure is maintained in the tank, the air being supplied through a flexible pipe 116 connected to a source of air pressure. Air pipes or nozzles 117 are arranged to direct air blasts downward against the parison molds 25 for cooling them. The nozzles may be formed with annular orifices 125 (Fig. 21) through which the air is directed. A nozzle 118 blows the air directly against the blown glass in the open upper end of the mold. The main purpose of this is to cool and stiffen the glass sufficiently to prevent it from becoming distorted when the parison mold opens and particularly while the bare parison is being swung downward to the finishing mold.

Pipes 119 extend downward from the tank and are provided with branch pipes or nozzles 120 to direct air against the finishing molds, and pipes 121 to blow air against the mold bottoms 122. It will be noted that with the construction above described the blowers move with the molds a certain distance and are thus much more efficient than a stationary blower directing an air blast against a rotating mold. Also, the same blower serves for cooling the entire set of molds so that the need of a separate blower for each mold is avoided. Valves 123 and 124 may be provided for regulating or cutting off the supply of air to the individual blowing nozzles.

Modifications may be resorted to within the spirit and scope of my invention.

What I claim is:

1. In a glass forming machine, the combination of a mold carriage and molds thereon, means to rotate said carriage continuously about a vertical axis, a frame mounted to oscillate about said axis, a blowing head carried by said frame, a piston motor operable to move said head into and out of engagement with the molds, and automatic means comprising a continuously rotating cam to oscillate said frame.

2. In a glass blowing machine, the combination of a mold carriage, an annular series of molds thereon open at their upper ends to receive charges of glass, means for rotating the mold carriage, an oscillating frame, heads carried thereby over the molds, means to move said heads downward into engagement with adjoining molds, means to supply air under pressure through one head to the mold thereunder, and means to supply air under pressure through the lower end of the other mold while said other head is in engagement therewith and blow the glass therein to hollow form.

3. In a glass blowing machine, the combination of a mold carriage, an annular series of molds thereon open at their upper ends to receive charges of glass, means for rotating the mold carriage, an oscillating frame, heads carried thereby over the molds, means to simultaneously lower said heads into engagement with adjoining molds and cause said heads to travel with the molds, means to supply air under pressure through one head while traveling with the mold for compacting a charge of glass in the mold, and means to blow air upward into the other mold and expand the glass within the mold and against said other head.

4. In a glass forming machine, the combination of a continuously rotating mold carriage, an annular series of open ended molds thereon, means for introducing charges of molten glass through the open ends of the molds, a frame mounted to oscillate about the axis of the mold carriage, a cam geared to the mold carriage for rotation, a connection between said cam and frame for oscillating the latter, a head carried by said frame, and means to cause said head to close said ends of the molds in succession and advance therewith during a portion of their rotation.

5. In a glass forming machine, the combination with a continuously rotating mold carriage and molds thereon, of a cooling mechanism comprising a blower arranged to blow air against the exterior of the molds and automatic means to cause the blower to advance with the mold carriage through a predetermined arc and then return to a new position relative to the carriage and again advance therewith.

6. In a glass forming machine, the combination of a continuously rotating mold carriage, an annular series of molds thereon, said molds being open at their upper ends to receive charges of glass, a mold closing head above the path of travel of the molds, means to move said head downward into position to close the end of a mold and to withdraw said head upward, means to blow the glass to hollow form in the mold while the latter is closed by said head, mechanism to cause said head to travel with the mold during said blowing and then return to position to engage a succeeding mold, and a blower arranged to travel with said head and positioned to direct a cooling blast against the blown glass in a mold while said head is in engagement with a succeeding mold.

7. The combination of a mold carriage rotatable about a vertical axis, a series of molds thereon, a cooling device comprising a nozzle to direct an air blast against the exterior surface of the molds, and means to cause said nozzle to advance with a mold through a predetermined arc and then return and advance with a succeeding mold.

8. In a glass forming machine, the combination of a continuously rotating mold carriage, molds thereon, an air tank, air pipes connected to the tank and arranged to simultaneously direct air blasts against a number of said molds, and means to cause said tank and pipes to advance with the carriage through a predetermined arc and then return and again advance with the carriage.

9. In a glass forming machine, the combination of a mold carriage, a blank mold open at one end to receive a charge of glass, means to close said end, means at the other end of the mold to blow the glass to hollow form in the mold, means to then remove the closure from said end leaving the glass exposed, means to then blow a cooling blast against the exposed glass, means to open the blank mold, a finishing mold, and automatic means to transfer the cooled hollow glass to the finishing mold.

10. In a glass forming machine, the combination of a rotating carriage, an inverted parison mold open at its upper end to receive a mold charge, a neck mold, an inverting head carrying the neck mold, means to blow a charge of glass to hollow form in the parison mold, means to blow a cooling blast against the upper end of the hollow parison, means to open the parison mold leaving the parison extending upwardly from the neck mold, means to rotate the inverting head and carry the parison downward, and a finishing mold to receive the parison.

Signed at Toledo, in the county of Lucas and State of Ohio, this 25th day of October, 1920.

RICHARD LA FRANCE.